May 13, 1958  S. E. WESTMAN  2,834,208
AIR STREAM DIRECTION INDICATOR
Filed March 24, 1954  4 Sheets-Sheet 1

SYDNEY E. WESTMAN,
INVENTOR.

BY John H. G. Wallace

May 13, 1958

S. E. WESTMAN 2,834,208

AIR STREAM DIRECTION INDICATOR

Filed March 24, 1954

SYDNEY E. WESTMAN,
INVENTOR.

BY John H. J. Wallace

May 13, 1958  S. E. WESTMAN  2,834,208
AIR STREAM DIRECTION INDICATOR
Filed March 24, 1954  4 Sheets-Sheet 3

SYDNEY E. WESTMAN,
INVENTOR.

BY

United States Patent Office 2,834,208
Patented May 13, 1958

2,834,208

AIR STREAM DIRECTION INDICATOR

Sydney E. Westman, Inglewood, Calif., assignor to The Garrett Corporation, Los Angeles, Calif., a corporation of California Application March 24, 1954, Serial No. 418,397

21 Claims. (Cl. 73—180)

This invention relates generally to instruments for measuring or indicating the direction of a fluid stream, and particularly relates to a transducer for indicating the angle of attack or the angle of yaw of an airplane.

Instruments for measuring the angle of attack or the angle of yaw of an airplane are well known. The angle of attack is measured in a vertical plane with respect to the airplane, that is, in a plane at right angles to the wings while the angle of yaw is measured in a horizontal plane passing through the airplane wings. Such instruments are used for a variety of purposes to indicate, for example, the flight conditions of the plane or for computing air data which might be used in automatic pilots or gunfire control systems. An air stream direction indicator conventionally makes use of a sensing head having a pair of angularly disposed slots or openings which are exposed to the air stream. If the relative direction of the air stream changes, the pressure developed by one of the slots will be larger than that of the other slot.

It has been suggested to provide a transducer for measuring either the angle of yaw or the angle of attack by electrical means responsive to the measured pressure differential and including an electric motor and associated electric equipment. Such an instrument will provide high accuracy, but a relatively slow response, and the electrical equipment is relatively heavy and requires a relatively large space. In some cases the electric motor is actuated by a pressure responsive switch, while in another case it has been proposed to utilize the difference in resistance caused by the air stream flowing past two heated resistors disposed in the sensing slots and forming part of an electric bridge.

The differential pressure developed by the sensing head may also be directly used for indicating the angle of attack. Thus, it has been suggested to provide a swinging vane-type instrument where the movable vane is subjected to the measured pressure differential and tends to readjust the sensing head. However, it has been found that such an instrument has an average operating time of the order of two hours only and soon becomes inoperative due to the large friction and the relatively small forces available. Additionally, the friction tends to be increased by foreign matter reaching the instrument through the sensing slots. In general, instruments of this type are not capable of utilizing the small pressure differentials which are available at relatively low speeds of the airplane and at high altitudes.

Another instrument of this general type has been proposed which makes use of a conventional pneumatic servo system for raising or lowering the swinging arm of the sensing head until it again points into the direction of the air stream. This instruments requires sliding valves which are subject to friction. Furthermore, no provision is made to stabilize the servo system, which might tend to become instable when the amplification is increased sufficiently to overcome the friction of the sliding valves.

It is an object of the present invention to provide an improved instrument for measuring or indicating the direction of a fluid stream such as an air stream, the instrument being relatively simple, light in weight and very accurate.

Another object of the invention is to provide an air stream direction transducer particularly adapted for use with an aircraft and having pneumatic pressure amplifier and power output stages which require no sliding valves, which are substantially insensitive to foreign matter and have a minimum of friction.

A further object of the invention is to provide a transducer of the character referred to which will remove accumulated moisture or water from the sensing head of the instrument.

Still another object of the invention is to provide pneumatic pressure amplifier and power output stages for a transducer which combine high amplification, large sensitivity, great accuracy, and sufficient torque for overcoming friction and for operating, for example, an electric output potentiometer, with linearity and fast response time without causing hunting or overshooting.

The transducer of the present invention includes a conventional sensing head rotatable about its longitudinal axis and having a pair of slots or apertures positioned at an angle to each other. Hence, the pressure developed at each of the sensing apertures is representative of the angle formed, for example, by a moving airplane with its air stream in a predetermined plane of the airplane. The differential pressure developed in this manner is impressed on a fluid pressure amplifier stage which includes a plurality of movable walls such as three diaphragms, which are connected to move in unison. Movements of the diaphragms are utilized to control a pneumatic or fluid pressure which varies in accordance with variations of the sensed differential pressure. These pressure variations which are amplified by the pressure amplifier stage are utilized in a power servo output stage for rotating the sensing head so that it points again into the direction of the air stream.

In accordance with the present invention, various means may be utilized for stabilizing the instrument. This may, for example, be done by providing a feedback orifice which provides damping and velocity-pressure feedback. Alternatively, a pneumatic feedback may be utilized which tends to stabilize the instrument. In accordance with a further modification phase lead of the pneumatic pressure may be provided for compensating for phase lag occurring in the instrument and for providing an anticipator action. By causing reverse air flow through the two orifices of the sensing head, it is feasible to remove accumulated moisture or water in the sensing head.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Referring now to the drawings, wherein like elements are designated by the same reference characters, and particularly to Figs. 1 through 8, there is illustrated an air stream direction transducer in accordance with the present invention. The transducer comprises a sensing head generally indicated at 15 which is rotatably mounted about its longitudinal axis and projects from a flange 16 by means of which the instrument may be mounted substantially flush with the skin of the plane. It will be understood that the instrument may be mounted to measure either the angle of attack or the angle of yaw, that is, the instrument may be mounted so that the sensing head 15 either rotates in a horizontal or in a vertical plane. The flange 16 is provided with a dish-shape portion 17 as shown particularly in Figs. 1 and 4 through which extends the sensing head 15. The instrument itself is covered by an outer casing 18 and may have a rear cover 20. An electric cable 21 and a conduit 22 for admitting a gas such as air under pressure, extend through the rear cover 20.

Figures 4, 5, 6:
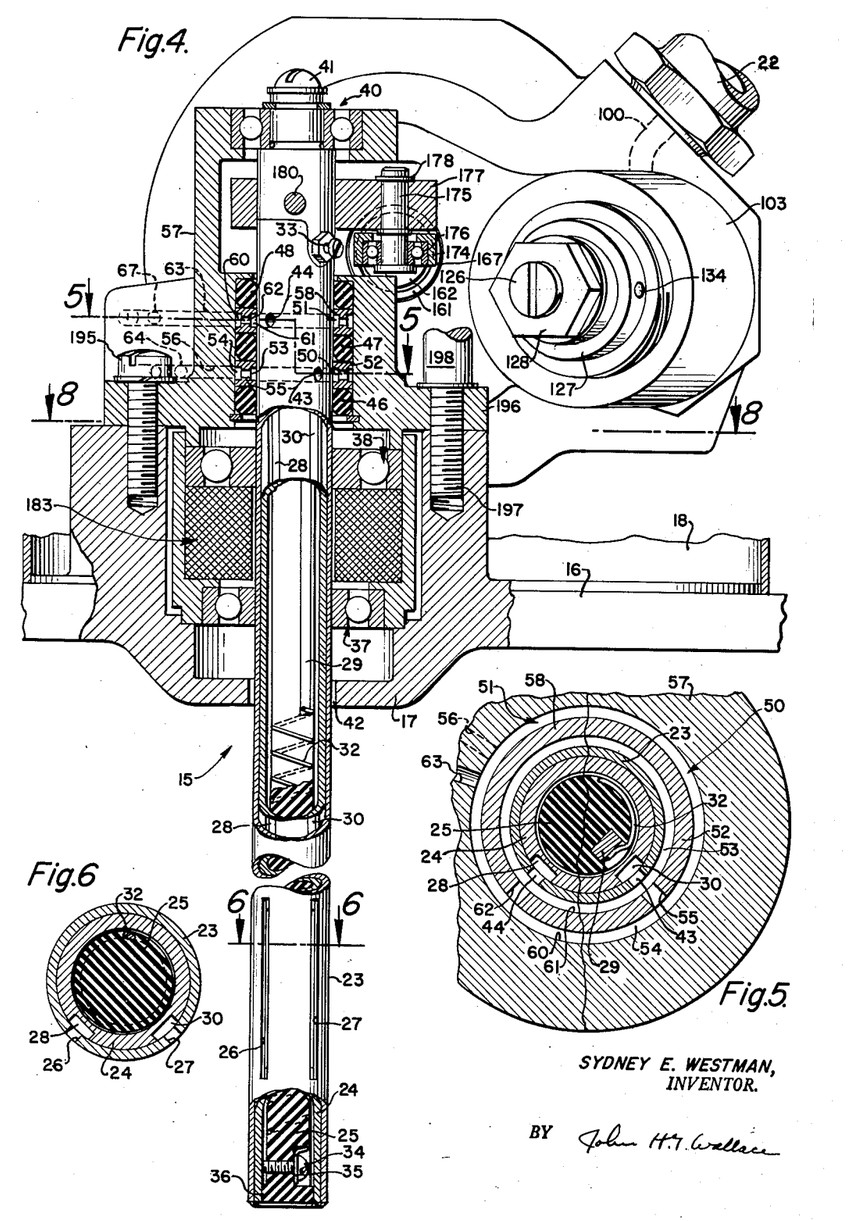
Fig. 4 is a sectional view taken on line 4—4 of Fig. 3 and illustrating particularly the sensing head and associated mechanisms.
Fig. 5 is a sectional view on enlarged scale taken on line 5—5 of Fig. 4 and illustrating the fluid pressure connections between the sensing head and the pneumatic amplifier.
Fig. 6 is a sectional view on enlarged scale taken on line 6—6 of Fig. 4 and illustrating details of the sensing head and its sensing slots.

The sensing head is shown particularly in Figs. 4 and 6, and includes an outer sleeve 23 which encloses an inner tube 24, preferably of metal, and an inner core 25 which preferably consists of an insulating material. A pair of elongated sensing apertures or slots 26 and 27 is provided in the outer shell 23. Longitudinal channels 28 and 30 are in register with the sensing slots 26 and 27, respectively, and extend along the inner tube 24 into the interior of the instrument. It will be noted from Fig. 6 that the two sensing slots 26 and 27 form an angle with each other, such as a right angle. The air pressures developed by the sensing slots 26 and 27 are transmitted through the longitudinal channels 28 and 30.

Preferably, the sensing head 15 is electrically heated, which may conveniently be effected by an electric resistance wire 32. This will prevent the formation of ice in the slots 26, 27 or channels 28, 30 during flight and will melt off any ice which may have formed prior to flight. The electric resistance wire 32 is helically wound about the central core 25 and one of its ends is electrically connected to a metal strip 29 which in turn connects to an electric terminal 33 (Fig. 4). The other end of the resistance wire 32 is secured by a screw 34 and washer 35 and is in electrical contact with the inner tube 24 which may be grounded to form a return connection for the electric circuit. In order to avoid electric contact between the resistance wire 32 and the grounded tube 24, the core 25 and its resistance wire 32 are spaced from the tube 24 as shown. The outer end of the inner core 25 is formed with an enlarged portion 36 in contact with the tube 24 and a similar enlarged portion is provided at the inner end of the core 25.

The sensing probe 15 is rotatably mounted intermediate its ends by a pair of ball bearings 37 and 38. The inner end of the probe is rotatably mounted by another ball bearing 40. Screw 41 may be provided in the inner end of the probe for facilitating the assembly of the sensing head. It will be noted that a gap 42 is provided between the dish-shape portion 17 of the flange 16 and the sensing head to permit free rotation of the head.

Figures 1, 2, 3:
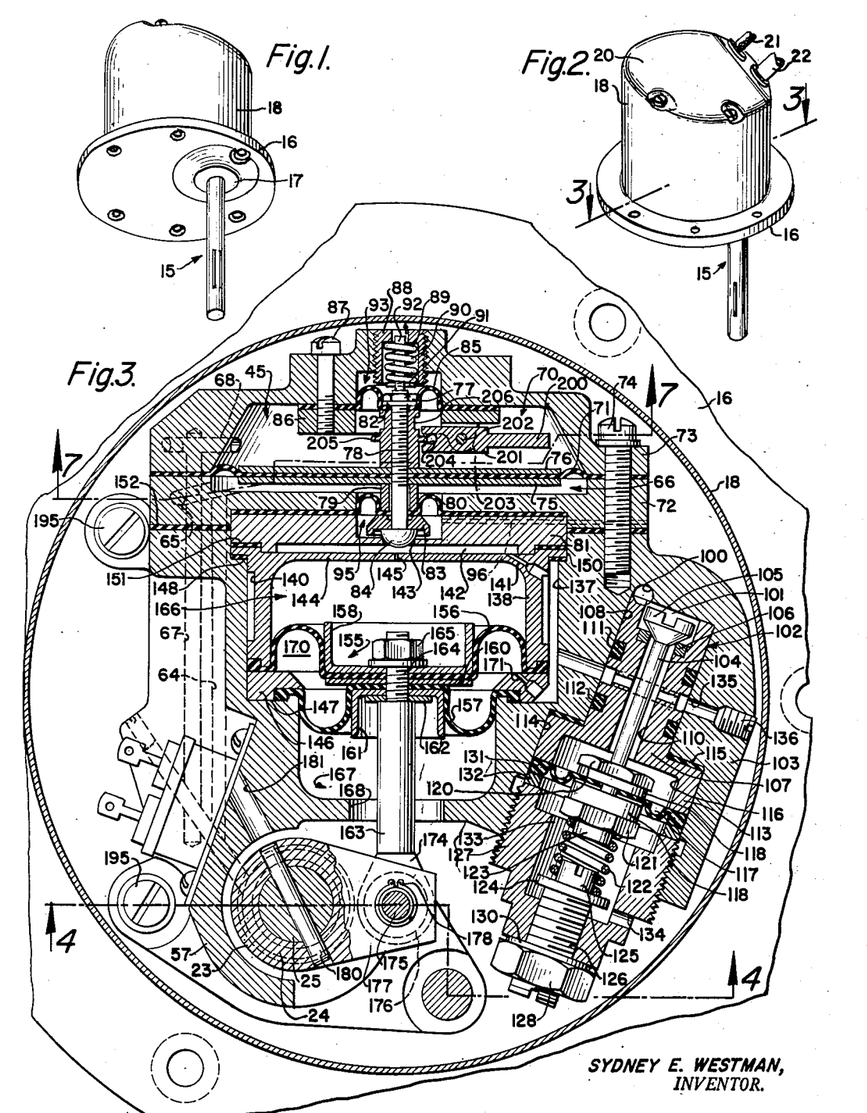
Fig. 1 is an isometric view of the air stream direction indicator of the invention illustrating particularly the portion of the instrument exposed to the air stream.
Fig. 2 is an isometric view of the instrument of Fig. 1 illustrating opposite portions thereof.
Fig. 3 is a sectional view on an enlarged scale taken on a substantially horizontal plane, as indicated by line 3—3 of Fig. 2, and illustrating particularly the pressure amplifier and power output stages of the instrument.

The air pressures developed by the sensing slots 26, 27 and the communicating longitudinal channels 28 and 30 must be connected to the pressure amplifier stage of the instrument, generally indicated at 45 in Fig. 3. To this end a pair of annular chambers is provided about the sensing head 15 between the ball bearings 38 and 40. These chambers are defined by three O rings 46, 47 and 48 forming two annular chambers 50 and 51. Disposed in the annular chamber 50, there is an annular metallic ring 52 having an inner annular groove 53 and an outer groove 54 which are connected by one or more slots 55. The chamber 50 formed in this manner communicates through an aperture 43 in the sleeve 23 with the channel 30. The chamber 50 also communicates with a bore 56 extending through a member 57 surrounding the inner portion of the sensing head.

The annular chamber 51 is formed by an annular metallic ring 58 having an outer groove 60 and an inner groove 61 communicating by one or more slots 62. The annular chamber 51 formed in this fashion communicates through an aperture 44 in the sleeve 23 with the channel 28. The chamber 51 also communicates with a bore 63 extending through the member 57. The bore 56 communicating with the annular chamber 50 in turn communicates with a bore 64 which communicates through another bore 65 with a diaphragm chamber 66. The other annular chamber 51 communicates through the bore 63 and bores 67 and 68 with another diaphragm chamber 70.

The chamber 66 is formed by a diaphragm 71 which is clamped at its edges by the members 72 and 73 secured together by screws 74. The central portion of the diaphragm 71 is covered by two circular plates or discs 75 and 76 which in turn are rigidly secured to a screw member 78.

The chamber 66 is limited on its lower side by another diaphragm 80 of smaller effective area. The edges of the diaphragm 80 are rigidly clamped between the member 72 and another member 81. The two members 72 and 81 are pressed against each other in a manner to be described later. The central portion of the diaphragm 80 is rigidly retained between a sleeve 79 bearing against the disc 75 and a member 83 which is retained by the semi-spherical head 84 of the screw member 78.

The chamber 70 is defined by the diaphragm 71 and a third diaphragm 85 having an effective area which substantially equals that of diaphragm 80. The edges of the diaphragm 85 are clamped between the member 73 and an annular member 86, the two members being secured together by screws 87. The central portion of the diaphragm 85 is clamped between a sleeve-like member 206 which bears against the disc 76 and a nut 77 and a washer 82, the nut 77 being tightened on the cover member 78.

The member 73 is provided with a threaded central opening through which extends a threaded sleeve 88 having a shoulder 89 against which bears a compression spring 90. The other end of the compression spring 90 bears against a pin 91 extending through an end portion 92 of reduced diameter of the screw member 78. The chamber 92 formed between the diaphragm 85 and the threaded sleeve 88 exhausts into atmosphere as indicated by the arrow.

It will accordingly be noted that the sensing slot 26 communicates through the longitudinal groove 28 and the aperture 44 with the annular chamber 51 and through bores 63, 67 and 68 with the chamber 70 defined by the diaphragms 71 and 85. The other slot 27 of the sensing head communicates through the longitudinal groove 30 and the aperture 43 with the annular chamber 50 and through bores 56, 64 and 65 with the chamber 66 defined by the diaphragms 71 and 80.

Consequently, the air pressure developed by the slot 26 is impressed on the chamber 70 and acts on the differences of the effective areas of diaphragms 71 and 85. The air pressure obtained from the slot 27 is impressed on the chamber 66, where it acts on the differences of the effective areas of diaphragms 71 and 80. If the pressures in the chamber 93 and in the chamber 95, provided between the diaphragm 80 and the disc 81, and the pressure acting on the semi-spherical head 84, were equal, the three diaphragms would be balanced under static conditions. In such case it would not be necessary to provide a compression spring 89 as shown. The chamber 95 exhausts to the ambient atmosphere through a bore 96, however, and hence, both the chambers 93 and 95 are subject to ambient atmospheric pressure. However, the semi-spherical head 84 is subjected to a controlled elevated pneumatic pressure in a manner to be presently described. Accordingly, the compression spring 90 compensates during static conditions for the elevated pressure which acts on the semi-spherical head 84.

This elevated pressure is applied through the conduit 22 which communicates with a bore 100 connected in turn to a chamber 101 forming part of a pressure regulator 102 which will now be described. The pressure regulator 102 provides a regulated output pressure which is controlled with respect to atmospheric pressure. In other words, the regulated output pressure of the pressure regulator is a gauge pressure. The conduit 22 may be obtained from any suitable source of air pressure such, for example, as turbo-jet engine compressor bleed air.

The pressure regulator 102 is disposed in the main body 103 of the instrument and includes a valve shaft 104 provided with a conical valve head 105 which cooperates with a valve seat 106. The valve seat 106 is provided in an annular member 107 disposed in turn in a cylindrical opening 108 in the body 103. The shaft 104 extends through a central bore or recess 110 in the cylindrical member 107. By means of O rings 111 and 112, the cylindrical member 107 is sealed in its cylindrical opening 108. The cylindrical member 107 has an enlarged cup-shape portion 113 disposed in a wider cylindrical opening 114 and sealed by a suitable annular seal 115 to the main body 103.

The cup-shape member 113 is provided with an inner recess 116. A diaphragm 117 has its inner portion clamped by a pair of clamping plates 118 which are tightened by a pair of lock nuts 120 and 121 cooperating with threads of the valve shaft 104. A spring 122 bears against the lock nut 121 and is guided by an enlarged end portion 123 of the valve shaft 104. The other end of compression spring 122 is supported by a flange 124 having a central guide portion 125. The flange 124 may be integral with a threaded portion 126 extending through a threaded cap 127 which may be screwed into the body 103. Rotation of the screw 126 will adjust the tension of spring 122 and the screw may be locked by lock nut 128 having a washer 130.

The outer edge of diaphragm 117 is sealed by means of an O ring 131 which is clamped by a ring 132 which in turn is tightened by a cap 127 against the cup portion 113. The chamber 133 formed between the diaphragm 117 and the cap 127 exhausts into atmosphere through a bore 134.

The pressure in the chamber formed by the cylindrical bore or recess 110 is controlled in accordance with the tension of spring 122 and the atmospheric pressure acting on the diaphragm 117. For example, if the pressure in the chamber 110 should decrease, the valve head 105 will further lift from its seat 106 to increase the pressure again since the chamber 110 communicates with a leak to atmosphere. On the other hand, if the pressure in chamber 110 should become too large, the valve head 105 will move toward the valve seat 106 to reduce the pressure. The nominal gauge pressure which is adjusted by the pressure regulator may be controlled by adjustment of the tension of spring 122 by means of the screw 126 and lock nut 128.

The regulated elevated pressure established in chamber 110 is now applied to the pressure amplifier 45. To this end the chamber 110 communicates with a bore 135, the outer end of which may be closed by a screw 136, as shown. The bore 135 communicates with a recess 137 forming part of an opening in the main body 103 which receives a cup-shape member 138. The member 138 is provided with an annular outer recess 140 communicating with a capillary passage 141 which represents an orifice for restricting the air flow therethrough. The capillary passage 141 communicates with a shallow chamber 142 formed between the cup-shape member 138 and the disc 81. The disc 81 is provided with a valve seat 143 for the semi-spherical head 84. The chamber 142 is defined by a wall 144 forming part of the cup-shape member 138, the wall being provided with a restricted opening or orifice 145.

A ring 146 bears against a shoulder 147 in the main body 103. The cup-shape member 138 bears against the ring 146 and is sealed by a sealing ring 148 to another shoulder 150 in the body 103. The disc 81 is sealed to the cup-shape member 138 by a sealing ring 151. The outer edge of the diaphragm 80 is retained between the disc 81 and the disc-shape member 72 as explained hereinbefore. The whole assembly including members 72 and 73 is locked to the body 103 by the screws 74 as described hereinbefore. A sealing ring 152 seals the disc 72 to the body 103.

The regulated air pressure provided by the pressure regulator 102 is also supplied to the power amplifier or power output stage, generally indicated at 155. The power output stage includes two diaphragms 156 and 157. The outer edge of the diaphragm 156 is clamped between the cup-shape member 138 and the ring 146. The outer edge of the diaphragm 157 is clamped between the ring 146 and the body housing 103. The central portion of the diaphragm 156 is clamped between a cup-shape member 158 and a circular disc 160. The diaphragm 157 is clamped between the disc 160 and another cup-shape member 161. The two cups 158, 161, the disc 160 and the two diaphragms 156 and 157 are secured together between a flange 162 of a lever 163 and a lock nut 165. The lock nut 165 is provided with a washer and is threaded to a threaded end portion 164 of the lever 163.

One side of the diaphragm 156 is exposed to the air pressure in a chamber 166 formed inside the cup-shape member 138. One side of the diaphragm 157 is exposed to atmospheric pressure prevailing in a chamber 167 which is formed in the body 103. The chamber 167 exhausts to atmosphere through an opening 168. The space 170 between the two diaphragms 156 and 157 is subjected to the regulated air pressure obtained from the regulator 102. To this end the recess 137 communicates with the chamber 170 through a capillary passage or orifice 171.

It will be noted that the power output stage 155 is not balanced by any springs. Hence, this stage normally, that is under static or equilibrium conditions, will be balanced by a suitable ratio of the pressures in chambers 166 and 170, which are equal, under static conditions, to the atmospheric pressure prevailing in chamber 167 and by the selected ratio of the effective areas of the two diaphragms. The diaphragm 156 has a larger effective area than that of the diaphragm 157. If the forces acting on the diaphragms were not balanced, it will be obvious that the diaphragms would continue to move.

The purpose of the power amplifier stage 155 is to rotate the sensing head 15 about its longitudinal axis until the sensing slots 26 and 27 again point into the direction of the air stream. To this end there is provided a linkage which includes the shaft or lever 163 having a head 174 provided with a pivot pin 175. The pin 175 is rotatably supported in a ball bearing 176 provided in the head 174. The pin 175 is secured to a bell crank lever 177 by a lock ring 178. The bell crank lever 177 is secured to the sensing head 15 by means of a pin 180 extending through the outer sleeve 23, the inner tube 24 and the core 25 of the sensing head, as shown particularly in Fig. 3. The pin 180 may be introduced through a suitable bore 181 in the body 103.

It will be seen that the pneumatic control system forms a closed loop servo system which will readjust the angular position of the sensing head 15 until the pressures developed by the sensing slots 26 and 27 are equal.

Figure 8:
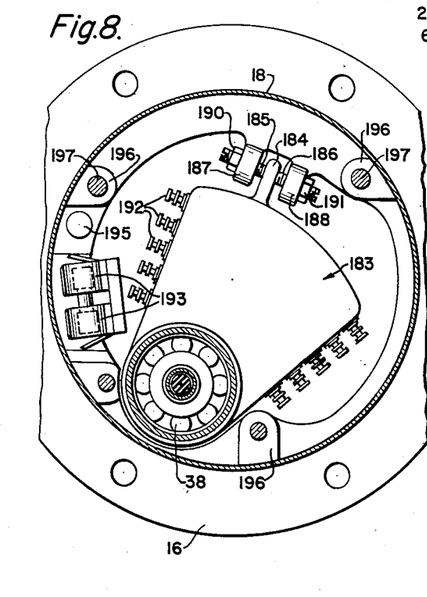
Fig. 8 is a sectional view taken on line 8—8 of Fig. 4, illustrating an electric potentiometer for developing an electric output signal.

The position of the sensing head 15 which, of course, indicates the direction of the air stream, may be measured by means of an electric potentiometer generally indicated at 183, shown particularly in Figs. 4 and 8. The potentiometer 183 is adjusted by means of an ear 184. The position of the ear 184 is determined by a pair of adjustment screws 185 and 186 extending through fixed projections 187 and 188 respectively. The adjustment screws 185 and 186 may be locked in position by lock nuts 190 and 191. The potentiometer 183 is arranged in such a manner that its slider moves in unison with rotation of the sensing head 15. It is provided with electric terminals indicated at 192 by means of which the potentiometer may be supplied with voltage and an output signal may be derived therefrom. Additional terminals may be provided for connecting suitable resistors in series with or across the potentiometer. Electric fuses indicated at 193 may be electrically connected to the potentiometer 183 to protect it from overload.

The member 57 may be secured to the flange 16 by suitable screws 195. The member 57 is provided with four supporting lugs 196 through which extend screws 197 having a head portion 198 which bears against the cover 20.

Figure 7:
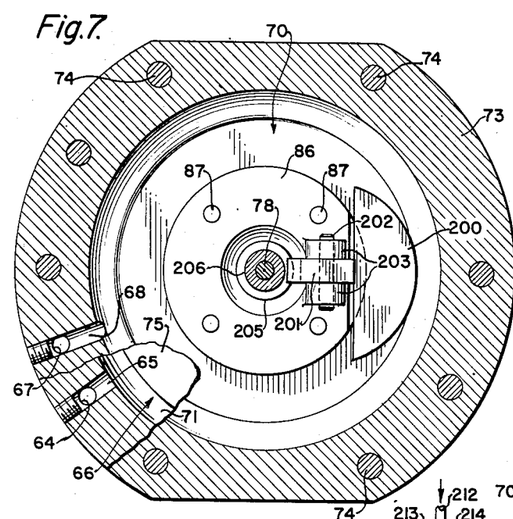
Fig. 7 is a sectional view taken on line 7—7 of Fig. 3, illustrating details of the pressure amplifier stage.

Referring particularly to Figs. 3 and 7, it will be noted that the pressure amplifier stage 45 is provided with a counterweight 200 which serves the purpose of rendering the movable portions or assembly of the pressure amplifier stage insensitive to the effects of linear acceleration. The counterweight 200 may have the shape of a segment of a disc and may be integral with a thicker extension 201 having a fixed pivot. The fixed pivot is provided by a pin 202 extending through the portion 201 and through a pair of ears 203 which are integral with or secured to the disc 86. The counterweight 200 has a slot 204 in its portion 201 which engages a flange 205 provided in the spacing sleeve 206 which bears against the disc 76 and the diaphragm 85. The counterweight 200 acts on the center of gravity of the movable assembly including the diaphragms 85, 71 and 80, the shaft 78 and associated parts. The counterweight 200 produces a force vector in the center of gravity of the movable assembly which will balance the force vector acting on the movable assembly due to the action of linear acceleration. Hence, the movable assembly becomes insensitive to the effects of linear acceleration. Such an arrangement for rendering a movable assembly insensitive to the effects of gravity has been disclosed and claimed in applicant's co-pending application entitled, "Pressure Ratio Measuring Instrument," Serial No. 403,135, filed on January 11, 1954.

Figure 10:
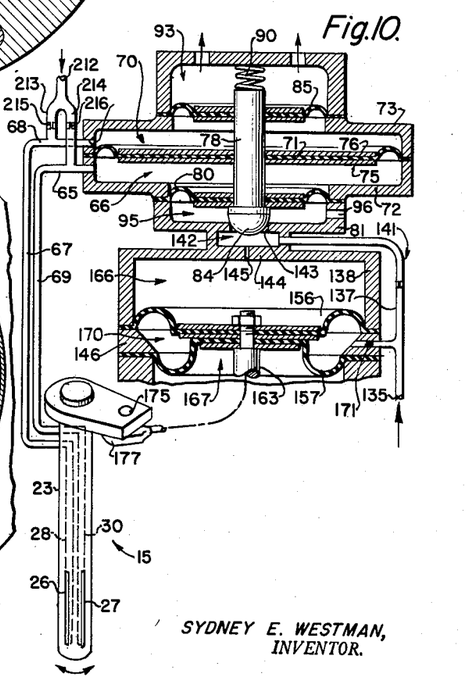
Fig. 10 is a schematic and simplified sectional view of a modified form of the instrument of the invention including means for preventing the accumulation of moisture in the sensing head.

The operation of the air stream direction indicator of the invention will now be described by reference to Fig. 10 which is a simplified schematic view of the instrument. Assuming that the sensing head 15 points into the direction of the air stream, the pressures in the two chambers 70 and 66 will be equal. It will be remembered that the chamber 66 is connected to the sensing slot 27 through the channel 30, the aperture 43, the chamber 50 and the bores 56, 64 and 65. The chamber 70 is connected to the sensing slot 26 through the channel 28, the aperture 44, the chamber 51 and the bores 63, 67 and 68. Under such a static or equilibrium condition, the pressure amplifier stage is balanced by the spring 90. Since the pressures in chambers 66 and 70 are equal, no resultant force acts on the diaphragm 71. Chamber 93 is exposed to ambient pressure as is chamber 95; however, the semi-spherical head 84 of the shaft 78 is exposed to an elevated pressure existing in chamber 142. Since the areas of diaphragms 85 and 80 are equal, a force acts on the semi-spherical head 84 which is balanced by the force of the spring 90. It will be understood that the spring 90 thus establishes a certain gauge pressure in chamber 142 with reference to the ambient pressure.

Under the assumed static conditions, the pressures in chambers 142 and 166 which communicate through the orifice 145 will be equal. The pressure in chamber 170 will be equal to the regulated elevated pressure which is obtained from the pressure regulator 102. The pressure in chamber 167 corresponds to the ambient pressure. Since the effective area of diaphragm 157 is smaller than that of diaphragm 156, the pressure amplifier or servo output stage 155 is balanced under static conditions.

Let it now be assumed that the relative direction of the air stream, which is normally directed centrally toward the sensing slots 26 and 27, swings in a clockwise direction, as viewed in Fig. 6. Accordingly, the pressure at the sensing slot 26 will be larger than that at the sensing slot 27. Consequently, the pressure in chamber 70 will be larger than that in chamber 66 and the shaft 78 will move toward the valve seat 143. This will reduce the effective opening between valve head 84 and valve seat 143 so that the pressure in chamber 142 will increase since air flows into the chamber from the pressure regulator 102 through conduits 135, 137 and orifice 141. This increased pressure will act on the diaphragm 156 and cause a downward movement of shaft 163. Consequently, the bell crank lever 177 will be rotated in a clockwise direction until the sensing head 15 again points in the direction of the air stream.

If the relative direction of the air stream should swing in a counter-clockwise direction, the pressure at sensing slot 27 will be larger than that at sensing slot 26. As a result, the pressure in chamber 66 will be larger than that in chamber 70. Consequently, the shaft 78 will move against the force of spring 90 to provide a wider opening between valve head 84 and valve seat 143. This will cause a reduction of pressure in chamber 142 and, as a result, the shaft 163 will move upward to rotate the bell crank lever 177 in a counter-clockwise direction. This, in turn, will again point the sensing head 15 into the direction of the air stream.

Since the area of diaphragm 71 is larger than that of diaphragms 85 and 80, this stage operates as a pressure amplifier.

The instrument illustrated in Figs. 1 through 8 and 10 has a high gain and develops sufficient torque, even for small angular deviations of the relative direction of the air stream, so that it will overcome friction. It will be noted that rotation of the sensing head 15 will also cause movement of the movable arm of the potentiometer 183 and develop an electric output signal indicative of the position of the sensing head. The power of the power output stage is sufficient to overcome the friction of the potentiometer.

As explained hereinbefore, the movable assembly of the pressure amplifier stage is made insensitve to the effects of linear acceleration. It will be understood that the power amplifier stage need not be balanced to compensate for the effects of linear acceleration because it will remain in any given position due to the power amplification provided thereby. The bulges or folds of the diaphragms 85, 71 and 80 will change depending on the pressures across the diaphragms. In other words, it is feasible that the pressure in chamber 70 is below that in chamber 93 in which case the diaphragm 85 would bulge in a downward direction. The diaphragm assembly of the power amplifier is self-centering and, therefore, no guide is needed which in turn reduces the friction. Since the pressure in chamber 170 will never be lower than that in chambers 166 and 167, the diaphragms 156 and 157 will always have the shape shown in the drawings. It will be noted that the instrument of the invention does not require sliding valves and, hence, has a much lower friction. Furthermore, the instrument is substantially insensitive to foreign matter because it has no sliding valves.

The orifice 145 which separates the chambers 142 and 166 provides a damping effect and increases the time constant of the pneumatic system depending on the relative volumes of chambers 142 and 166 and on the size of the orifice. It permits higher amplification of the unit without reducing its stability or causing overshooting.

As explained hereinbefore, the sensing head 15 may be heated by causing electric current to flow through the resistance wire 32. This arrangement will melt any ice which may have formed in or around the sensing channel 15 before take-off and will prevent the formation of ice during flight, that is, as long as the wire 32 is heated.

Figure 9:
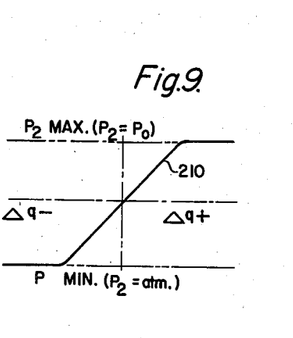
Fig. 9 is a graph illustrating the response characteristic of the instrument of Figs. 1 to 8.

Referring now to Fig. 9, there is illustrated a curve 210 which indicates the changes of the pressure $P_2$ which is the pressure in chamber 142 caused by a pressure differential $\Delta q$ which is the difference of the sensed pressures existing in chambers 66 and 70. The pressure $P_2$ reaches a maximum which equals the pressure $P_0$ which is the regulated elevated pressure. The pressure $P_2$ has a minimum which is determined by the atmospheric pressure. The slope of the curve 210 indicates the amplification provided by the pressure amplifier stage.

Tests have indicated that the instrument of the invention, as shown in Figs. 1 to 8, has an accuracy of 0.1 degree of the sensing head between sea level and an altitude of 35,000 feet at a velocity of 0.6 Mach or greater. The accuracy will decrease when the difference between the total and the static air pressure, which is the dynamic air pressure, decreases below a certain value. For example, the instrument may be designed so that the accuracy of 0.1 degree will be maintained until the dynamic air pressure falls below 0.5″ mercury, or .245 pound per square inch. The dynamic air pressure depends essentially on the air density, and on the velocity of the airplane. Hence, it may be expected that the accuracy decreases when the airplane is flying at greater heights and lower speeds. Tests have further shown that the instrument of Figs. 1 to 8 has the ability to follow a pneumatic input signal which may be varied at a frequency as high as six cycles per second without serious attenuation. It has further been found that this response speed is relatively independent of flight conditions unlike the characteristics of prior art devices. The same is true of the instrument of Fig. 14 which will be discussed more in detail hereinafter.

It may be pointed out that the power amplifier or servo output stage develops a velocity in the absence of any substantial friction or other restraining force, which is essentially proportional to variations of the pressure $P_2$. On the other hand, when the power amplifier stage is stalled, it develops a force which is essentially proportional to the pressure differential $\Delta q$ times a constant, which expression defines essentially the amplification ratio. Hence, the force developed depends on the areas of the diaphragms 71, 80, 85, 156, 157 and on the effective area of the valve 84, 143.

Under some atmospheric conditions, water may collect in the slots 26, 27 and in their communicating channels 28 and 30. Such water may collect due to melted ice or rain and is, of course, detrimental to the proper operation of the instrument. As illustrated in Fig. 10, it is feasible to remove this water by means of air pressure. To this end a pipe or tube 212 may be supplied with air at a regulated elevated pressure, for example, from the pressure regulator 102. Pipe 212 connects through pipes 213 and 214 with the bores 68 and 65 respectively. Pipes 213 and 214 are provided respectively with orifices 215 and 216. These orifices should be properly matched so that an equal air flow is caused through the bores 68 and 65 and into sensing slots 26 and 27. This air flow will force any water which might be contained in the sensing head out through the sensing slots 26 and 27. Since the air pressures in the bores 68 and 65 are equal, they will not change the operation of the instrument because the pressures in the chambers 66 and 70 will both be increased by the same amount. It will be understood that only a very small air flow is required to maintain the passageways between the sensing slots 26, 27 and the chambers 70 and 66 free and unobstructed.

Figure 11:
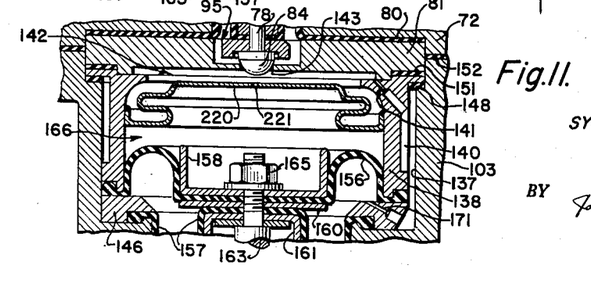
Fig. 11 is a schematic sectional view of a portion of a modified power amplifier stage which will compensate for phase lags in the pneumatic system.

Referring now to Fig. 11, there is illustrated a modification of the instrument of Figs. 1 to 8. The pneumatic system inevitably produces phase delays which might cause the instrument to be unstable. This may be overcome by providing a flexible bellows 220 rigidly secured to the member 138 to separate the chambers 142 and 166. This flexible diaphragm replaces the rigid wall 144 and aperture 145, which separates the chamber 166 from the chamber 142. The bellows 220 is provided with an aperture 221.

This arrangement has the effect of advancing the phase of the output signal. In other words, it operates as an anticipator and compensates for excessive phase lags which might occur in the pneumatic system. Thus, if the pressure in chamber 142 should suddenly increase, the effect will be immediately transmitted to the chamber 166 by flexing of the diaphragm 220 toward chamber 166. Eventually, the pressure differences between chambers 142 and 166 will be equalized through the orifice 221. On the other hand, if the pressure in chamber 142 should suddenly drop, the bellows 220 will expand accordingly, so that the pressure in chamber 166 will follow any pressure changes in chamber 142 almost instantaneously.

Figures 12, 13, 14:
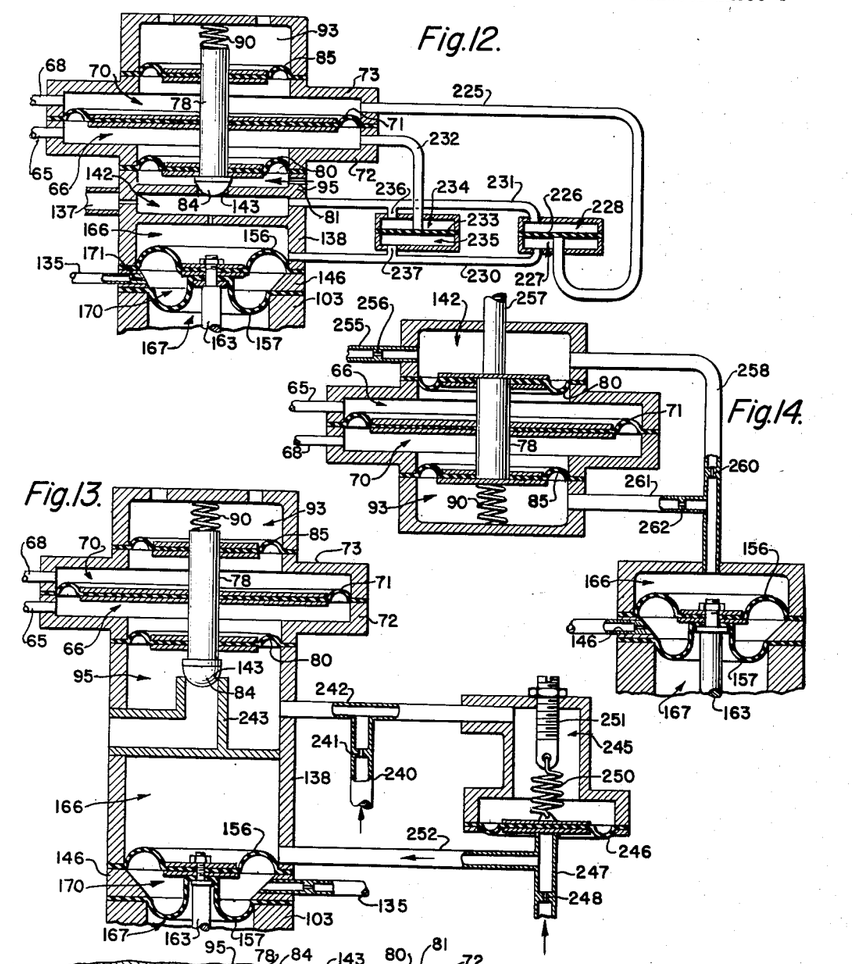
Fig. 12 is a schematic view similar to Fig. 10 of a modified pneumatic control mechanism including a pneumatic feedback arrangement.
Fig. 13 is a schematic view similar to Fig. 10 of a further modification of the pneumatic control mechanism of the invention including an additional pneumatic amplifier stage.
Fig. 14 is a simplified schematic view of still another modification of the pressure amplifier stage including pneumatic velocity-pressure feedback for improved stability.

Fig. 12 illustrates schematically a further modified embodiment of the instrument of the invention. The air stream direction indicator of Fig. 12 again includes a pressure amplifier stage, and a power amplifier or servo output stage, both being identical to that illustrated, for example, in Fig. 10. However, the instrument of Fig. 12 is provided with a pneumatic feedback for increasing the stability of the instrument and also its linearity. The feedback arrangement includes a pipe 225 connected to the chamber 70. The other end of the pipe is open and is normally closed by a diaphragm 226 which is clamped at its edges as shown. The diaphragm 226 defines a pair of chambers 227 and 228. The pipe 225 communicates with the chamber 227 which, in turn, communicates through a pipe 230 with the chamber 166 of the power amplifier. The chamber 228 communicates through a pipe 231 with the chamber 142. Similarly, the chamber 66 of the pressure amplifier is connected to pipe 232. The open end of the pipe 232 is normally closed by a diaphragm 233 which is clamped at its outer edges. The diaphragm 233 defines two chambers 234 and 235. The pipe 232 communicates with the chamber 234. By means of a branch pipe 236, the chamber 234 communicates with the pipe 231, that is, with the chamber 142. The chamber 235 communicates by means of a branch pipe 237 with the pipe 230 and, hence, with the chamber 166. It will be understood that the diaphragms 226 and 233 are normally in contact with their respective pipes 225 and 232.

In order to explain the operation of the modified instrument of Fig. 12, it may be assumed that the pressure in the chamber 70 increases momentarily. In the manner previously explained, this will cause a movement of the shaft 78 and of its valve head 84 toward its seat 143. Consequently, the pressure in chamber 142 will also increase. This increased pressure in the chamber 142 is communicated through pipe 231 and branch pipe 236 to the chamber 234, the pressure of which now increases. This in turn will cause the diaphragm 233 to bulge away from the open end of the pipe 232 permitting the increased pressure in the chamber 234 to communicate through pipe 232 with the chamber 66. The increase of the pressure in the chamber 66, which is caused in this manner, counteracts the original increase of the pressure in chamber 70 and, hence, prevents a too rapid initial change of the controlled pressure in the chamber 142.

It will be obvious that the increase of the pressure in chamber 142 is also transmitted through pipe 231 into the chamber 225. This increased pressure will insure that the diaphragm 226 closes the pipe 225.

If the pressure in chamber 66 should suddenly increase, this will cause an upward movement of the valve head 84 with a subsequent reduction in pressure in the chamber 142. As a result, the pressure in chamber 234 will also decrease so that the diaphragm 233 is in contact with its pipe 232 preventing any communication between chambers 234 and 66. However, the reduced pressure in chamber 142 will not immediately appear in chamber 166, which still has a higher pressure than that of chamber 142. Since the pressure in chambers 166 and 142 appear respectively in chambers 227 and 228, it will be seen that the diaphragm 226 is caused to lift from its pipe 225 by virtue of this pressure differential. As a result, the relatively high pressure of chamber 166 appears in chamber 227 and also in chamber 70. This increase in pressure of the chamber 70 will also counteract the original pressure change in chamber 66 with the result previously described.

The feedback arrangement of the system of Fig. 12 may be termed a velocity feedback which slows down the response, stabilizes the system and provides for greater linearity. Furthermore, it makes the response less sensitive to absolute variations of the sensed pressure differential. In view of the pneumatic feedback, it is possible to utilize higher amplification which, in turn, permits more sensitivity or higher accuracy. The higher amplification, in turn, will override larger friction. On the other hand, the system of Fig. 12 is more complicated and also requires more space. It should also be noted that greater stability is obtained without a substantial loss of response speed.

As explained hereinbefore, the pneumatic feedback produces an increased pressure in either the chamber 70 or in the chamber 66, as the case may be. This increased pressure in turn causes a reversal of the air flow and tends to force any water which may have accumulated in the sensing head out of the sensing slots. Accordingly, in the system of Fig. 12, it usually will not be necessary to provide a reversed air flow through the bores 68 and 65, as shown in Fig. 10.

The instrument illustrated schematically in Fig. 13 includes an extra pneumatic amplifier stage provided between the pressure amplifier and the power output stage. Hence, since the system has two pneumatic amplifier stages, it is possible to provide even higher gains. The pressure amplifier stage is again similar to that of the systems of Figs. 10 or 12. However, the chamber 95 does not exhaust to atmosphere, as in the previous systems, but instead the regulated elevated pressure is supplied thereto by a supply pipe 240 provided with an orifice 241 and a branch pipe 242 which directly communicates with the chamber 95. The valve seat 143 is provided in a suitable exhaust pipe 243 which exhausts to atmosphere as shown. Hence, the pressure in chamber 95 is controlled in accordance with variations of the sensed pressures.

The branch pipe 242 further communicates with a chamber 245 which is defined by a diaphragm 246 having its outer edges suitably clamped. The central portion of the diaphragm 246 cooperates with a tube 247 to which the elevated pressure is applied through an orifice 248. The diaphragm 246 is balanced for equilibrium or static conditions by a spring 250 supported by a screw 251 which permits adjustment of the spring force.

Movements of the diaphragms 246 will adjust the pressure in the pipe 247 which communicates through a pipe 252 with the chamber 166 of the power output stage. It will be noted that the effective area of diaphragm 80 is exposed to the elevated controlled pressure in the chamber 95, while atmospheric pressure acts on the effective area of the valve head 84. The diaphragm 85 is again exposed to atmospheric pressure. Hence, the spring 90 must counteract the elevated pressure acting on the difference between the effective areas of diaphragm 80 and valve head 84 which is partly balanced by the atmospheric pressure acting on diaphragm 85.

The pressure amplifier of the system of Fig. 13 operates again in the manner previously described. Hence, movements of the valve head 84 with respect to its valve seat 143 will cause changes of the pressure in chamber 95. These pressure changes are transmitted by pipe 242 into the chamber 245. As a result of these pressure changes, the diaphragm 246 moves with respect to the pipe 247, thus causing variations of the pressure in pipe 252. These pressure variations are transmitted to the chamber 166 where they cause movement of the power output stage as previously described. However, it will be obvious that the changes of the pressure in chamber 166 are magnified with respect to the pressure changes produced in chamber 95.

It will be noted that the pressure amplifier of the system of Fig. 13 requires three working diaphragms 85, 71 and 80. This is so because different pressures act on the diaphragms 85 and 80. In the pressure amplifiers, as shown for example in Figs. 10 and 12, however, equal pressures act on the diaphragms 85 and 80, and hence the diaphragms act essentially as fluid seals and may be replaced by any suitable equivalent seal if it be sufficiently frictionless.

The pneumatic system of Fig. 14, to which reference is now made, includes a power output stage which is identical with that of the figures previously discussed. However, the pressure amplifier stage includes a damping and feedback orifice and a stabilizing orifice which greatly improve its operation. The pressure amplifier stage again includes a diaphragm 71 responsive to the sensed pressure differential and the diaphragms 85 and 80. However, both the chambers 142 and 93 are exposed to a controlled elevated pressure. To this end the regulated pressure is impressed through a pipe 255 and an orifice 256 on the chamber 142. The chamber 142 is provided with an exhaust pipe 257 which cooperates with the shaft 78 or with the diaphragm 80 to provide a variable orifice, thereby to exhaust into atmosphere a controllable portion of the air in chamber 142. The chamber 142 is connected through a pipe 258 and a damping orifice 260 to the chamber 166 of the power amplifier. The pipe 258 is connected downstream of the orifice 260 through a pipe 261 with the chamber 93. The pipe 261 may be provided with a stabilizing orifice 262.

If the effective areas of the diaphragms 80 and 85 are exactly equal, the pressure amplifier will be balanced under static or equilibrium conditions without the use of a spring. Preferably, however, the effective area of diaphragm 85 in made slightly smaller than that of diaphragm 80. Consequently, a compression spring 90 may be provided in the chamber 93, the spring biasing the shaft 78. By suitable adjustment of the force of spring 90, the pressure amplifier may be balanced.

Considering the operation of the system of Fig. 14, let it be assumed that the pressure in the chamber 66 increases. Accordingly, the shaft 78 will move in a direction to increase the leak between the shaft and the exhaust tube 257. Consequently, the pressure in chamber 142 will decrease. Since the pressure in chamber 142 is now less than that in chamber 93, the forces acting on diaphragms 80 and 85 will resist rapid movements of shaft 78. This pressure change in the chamber 142 acts through the damping orifice 260 on the chamber 166. As a result, the power amplifier begins to operate, slowly at first, and continues its movement with an increasing force. It will be understood that, although the pressure in chambers 142 and 166 will not equalize immediately, there will be an immediate velocity flow through the orifice 260 in response to any changes of the pressures. The orifice 262 feeds back the pressure changes of the chamber 142 into the chamber 93 with a time delay until the pressures in chambers 142 and 93 are equal again. This time delay of the pressure change provides stabilization of the system.

It has been found that the system of Fig. 14 provides a very high static gain, while the dynamic gain may be made smaller. For example, if the effective areas of diaphragms 80 and 85 are exactly equal, the static gain is very great. Due to this high static gain, the static error is greatly reduced. On the other hand, since the dynamic gain is relatively low, over-shooting and hunting are effectively prevented. The feedback through the orifice 260 might be called a velocity-pressure feedback providing increased stability. The high static gain, of course, provides high accuracy. The modification of the invention of Fig. 14 is presently considered a preferred embodiment of the invention.

What is claimed is:

1. An instrument for measuring the angle of a moving aircraft with its air stream in a predetermined plane of the aircraft, said instrument comprising an angular movable sensing head having a pair of apertures positioned at an angle to each other, each of said apertures being adapted to sense a fluid pressure representative of said angle of said airplane; a fluid pressure amplifier stage, means applying the fluid pressures sensed by said apertures to said pressure amplifier stage, a source of regulated fluid pressure, means coupled to said pressure amplifier stage for varying the magnitude of said regulated fluid pressure in response to variations of said fluid pressures sensed by said apertures; a power output stage, said output stage being responsive to variations of said regulated fluid pressure; and means coupling said output stage to said sensing head whereby said sensing head is rotated until said fluid pressures sensed by said apertures are equal.

2. An instrument for measuring the angle formed by a moving airplane with its air stream in a predetermined plane of the airplane, said instrument comprising a sensing head movable between predetermined limits and having a pair of apertures positioned at an angle to each other, each of said apertures being adapted to develop a fluid pressure representative of said angle of said airplane; a fluid pressure amplifier stage including a plurality of movable walls of different effective areas, said movable walls being connected to move in unison, means applying the fluid pressures developed by said apertures to said movable walls means biasing said movable walls to balance the forces acting thereon when said fluid pressures are equal, a source of regulated fluid pressure, variable aperture means coupled to said movable walls for varying the magnitude of said regulated fluid pressure in response to variations of said fluid pressures developed by said apertures; a power output stage, said output stage being responsive to variations of said regulated fluid pressure; and means coupling said output stage to said sensing head whereby said sensing head is rotated until said fluid pressures developed by said apertures become equal.

3. An instrument for measuring the angle formed by a moving airplane with its air stream in a predetermined plane of the airplane, said instrument comprising an angularly movable sensing head having a pair of apertures positioned at an angle to each other, each of said apertures being adapted to develop a fluid pressure representative of said angle of said airplane; a fluid pressure amplifier stage including three movable diaphragms of different effective areas, said diaphragms being connected to move in unison, means applying the fluid pressures developed by said apertures between respective pairs of said diaphragms, means biasing said diaphragms to balance the forces acting thereon when said fluid pressures are equal, a source of regulated fluid pressure, variable aperture means coupled to said diaphragms for varying the magnitude of said regulated fluid pressure in response to variations of said fluid pressures developed by said apertures; a power output stage, said output stage being responsive to variations of said regulated fluid pressure; and means coupling said output stage to said sensing head for rotating said sensing head until said fluid pressures developed by said apertures become equal.

4. An instrument for measuring the angle formed by a moving airplane with its air stream in a predetermined plane of the airplane, said instrument comprising an angularly movable sensing head having a pair of apertures positioned at an angle to each other, each of said apertures being adapted to develop a fluid pressure representative of said angle of said airplane; a fluid pressure amplifier stage including three movable diaphragms of different effective areas, a member connecting said diaphragms to permit movement thereof in unison, means applying the fluid pressures developed by said apertures respectively between a first and a second one of said diaphragms and said first and a third one of said diaphragms, spring means biasing said diaphragms to balance the forces acting thereon when said fluid pressures are equal, a source of regulated fluid pressure, valve means cooperating with said member for varying the magnitude of said regulated fluid pressure in response to variations of said fluid pressures developed by said apertures; a power output stage, said output stage being responsive to variations of said regulated fluid pressure; means coupling said output stage to said sensing head for rotating said sensing head until said fluid pressures developed by said apertures become equal; and potentiometer means coupled to said sensing head for developing an output voltage representative of the angular position of said sensing head.

5. A differential pressure responsive device comprising: a fluid pressure amplifier stage including a first and a second movable wall defining a first chamber, a third movable wall defining, with said first movable wall, a second chamber, said first movable wall having a larger effective area than that of said second and of said third movable wall, means for applying the differential pressures, to be measured, to said first and second chambers, a first member interconnecting said first, second and third movable walls to permit movement thereof in unison, a source of regulated fluid pressure, a third chamber, means including a first constant orifice for connecting said source to said third chamber, a second variable orifice connecting said third chamber to a reference pressure, said first member cooperating with said second variable orifice, means for balancing the forces acting on said movable walls when the differential pressures are equal, whereby variations of the relative position of said member modulate the pressure in said third chamber; a power output stage including a fourth and a fifth movable wall, a second member interconnecting said fourth and said fifth movable wall, the effective area of said fourth movable wall being larger than that of said fifth movable wall, said fourth movable wall being responsive to the pressure of said third chamber, means connecting the space between said fourth and fifth movable walls to said source, said fifth diaphragm being exposed to said reference pressure; and utilization means coupled to said power stage.

6. A differential pressure responsive device comprising: a fluid pressure amplifier stage including a first and a second diaphragm defining a first chamber, a third diaphragm defining, with said first diaphragm, a second chamber, said first diaphragm having a larger effective area than that of said second and of said third diaphragm, means for applying the differential pressures, to be measured, to said first and second chambers, said second and third diaphragms being exposed to a reference pressure, a first member interconnecting said first, second and third diaphragms to permit movement thereof in unison, a source of regulated fluid pressure, a third chamber, means including a first constant orifice for connecting said source to said third chamber, a second variable orifice connecting said third chamber to said reference pressure, said first member cooperating with said second variable orifice, means for balancing the forces acting on said diaphragms when the differential pressures are equal, whereby variations of the relative position of said member modulate the pressure in said third chamber; a power output stage including a fourth and a fifth diaphragm, a second member interconnecting said fourth and fifth diaphragm, the effective area of said fourth diaphragm being larger than that of said fifth diaphragm, said fourth diaphragm being exposed to the pressure of said third chamber, means connecting the space between said fourth and fifth diaphragms to said source, said fifth diaphragm being exposed to said reference pressure; and utilization means coupled to said power stage.

7. A pressure responsive device as defined in claim 6 wherein a rigid wall is provided for separating said third chamber into a first and a second portion, said first portion of said third chamber communicating with said second variable orifice, said fourth diaphragm being exposed to the pressure of said second portion of said third chamber, and an orifice in said rigid wall for providing communication between the two portions of said third chamber, whereby pressure changes in said first portion of said third chamber are communicated to said fourth diaphragm with a time delay.

8. A pressure responsive device as defined in claim 6 wherein a flexible wall is provided for separating said third chamber itno a first and a second portion, said first portion of said third chamber communicating with said second variable orifice, said fourth diaphragm being exposed to the pressure of said second portion of said third chamber, and an orifice in said flexible wall for providing communication between the two portions of said third chamber, whereby transient pressure changes in said first portion of said third chamber are substantially instantaneously transmitted to said second portion of said third chamber to provide a phase lead of said pressure changes.

9. A pressure responsive device as defined in claim 8 wherein said flexible wall consists of a bellows.

10. An instrument for measuring the angle formed by a moving airplane with its air stream in a predetermined plane of said airplane, said instrument comprising a sensing head rotatable about its axis and having a pair of apertures positioned at an angle from each other, each of said apertures being adapted to develop an air pressure representative of said angle of said airplane, a pressure amplifier stage, a first pair of conduits connecting each of said apertures individually to said pressure amplifier stage for impressing the air pressures developed thereby on said pressure amplifier stage, a source of regulated elevated air pressure, means coupled to said pressure amplifier stage for varying the magnitude of said regulated air pressure in response to variations of said air pressures developed by said apertures; a power output stage, said output stage being responsive to variations of said regulated air pressure; means coupling said output stage to said sensing head for rotating said sensing head until said air pressures developed by said apertures are equal; and a second pair of conduits, each including an orifice connecting said source to each of said first pair of conduits for providing substantially equal air flows through each of said apertures, whereby moisture contained in said first pair of conduits and apertures is forced out of said apertures.

11. An instrument for measuring the angle formed by a moving airplane with its air stream in a predetermined plane of said airplane, said instrument comprising a sensing head rotatable about its axis and having a pair of apertures positioned at an angle from each other, each of said apertures being adapted to develop an air pressure representative of said angle of said airplane; a pressure amplifier stage including a first and a second diaphragm defining a first chamber, a third diaphragm defining, with said first diaphragm, a second chamber, said first diaphragm having a larger effective area than that of said second and of said third diaphragm, a first pair of conduits connecting each of said apertures individually to said first chamber and to said second chamber for impressing the air pressures developed thereby on said pressure amplifier stage, said second and third diaphragms being exposed to a reference pressure, a first member interconnecting said first, second and third diaphragms to permit movement thereof in unison, a source of regulated elevated air pressure, a third chamber, means including a first constant orifice for connecting said source to said third chamber, a second variable orifice connecting said third chamber to said reference pressure, said first member cooperating with said second variable orifice, means for balancing the forces acting on said diaphragms when the differential pressures are equal, whereby variations of the relative position of said member modulate the pressure in said third chamber; a power output stage, said output stage being responsive to variations of the pressure of said third chamber; means coupling said output stage to said sensing head for rotating said sensing head until said air pressures developed by said apertures are equal; and a second pair of conduits, each including an orifice connecting said source to each of said first pair of conduits for providing substantially equal air flows through each of said apertures, whereby moisture contained in said first pair of conduits and apertures is forced out of said apertures.

12. In a differential pressure measuring instrument, a power output stage responsive to variations of the pressure in a first chamber, said power output stage including a first and a second diaphragm, means for mounting said first and second diaphragms to form an enclosed space surrounding one surface of said first diaphragm, a member connecting said diaphragms, whereby said diaphragms move in unison with said member, said one surface of the first diaphragm being exposed to the pressure variations in said first chamber, a second chamber defined by the space between said diaphragms and said mounting means, the effective area of said first diaphragm being larger than that of said second diaphragm, conduit means for connecting a source of elevated regulated pressure to said second chamber, and means for exposing the surface of the second diaphragm opposite said second chamber to a reference pressure, whereby said diaphragms move in response to changes of the pressure in said first chamber.

13. In a differential pressure measuring instrument, a pressure amplifier stage comprising a first, a second and a third diaphragm, said second and said third diaphragm having equal effective areas, the effective area of said first diaphragm being larger than that of said second diaphragm, said diaphragms being secured to a common shaft and movable in unison therewith, said first and said second diaphragms defining a first chamber, said first and third diaphragms defining a second chamber, means applying the pressures to be measured respectively to said first and to said second chamber, said second and said third diaphragm being exposed to a reference pressure, a source of regulated elevated pressure, a third chamber, conduit means having a first orifice for connecting said source to said third chamber, said third chamber having an opening communicating with said reference pressure, said shaft being movable with respect to said opening, whereby variations of the relative position of said shaft will cause modulation of the pressure in said third chamber, and spring means coupled to said shaft for balancing said shaft and its associated diaphragms when the pressures in said first and second chambers are equal; and a power output stage responsive to variations of the pressure in said third chamber, said power output stage including a fourth and a fifth diaphragm, a member connecting said fourth and said fifth diaphragm, whereby said fourth and fifth diaphragms move in unison with said member, a fourth chamber defined by said fourth diaphragm, a second orifice connecting said third chamber to said fourth chamber, a fifth chamber defined by the space between said fourth and fifth diaphragm, the effective area of said fourth diaphragm being larger than that of said fifth diaphragm, further conduit means connecting said source to said fifth chamber, said fifth diaphragm being exposed to said reference pressure, whereby said fourth and fifth diaphragm move in response to changes of the pressures in said first and second chambers.

14. In a differential pressure measuring instrument, a pressure amplifier stage comprising a first, a second and a third movable wall, the effective area of said first movable wall being larger than that of said second movable wall and larger than that of said third movable wall, said movable walls being secured to a member and movable in unison therewith, said first and said second movable walls defining a first chamber, said first and third movable walls defining a second chamber, means applying the pressures to be measured respectively to said first and to said second chamber, said second and said third movable wall being exposed to a reference pressure, a source of regulated elevated pressure, a third chamber, first conduit means having a first orifice for connecting said source to said third chamber, said third chamber having an opening communicating with said reference pressure, said member being movable with respect to said opening, whereby variations of the relative position of said member will cause modulation of the pressure in said third chamber, spring means coupled to said member for balancing said movable wall when the pressures in said first and second chamber are equal, a fourth chamber, a second orifice connecting said third chamber to said fourth chamber, a fifth and a sixth chamber, a fourth movable wall separating said fifth and sixth chamber, second conduit means connecting said first chamber to said fifth chamber, third conduit means connecting said fifth chamber to said fourth chamber, fourth conduit means connecting said sixth chamber to said third chamber, said second conduit means being closed by said fourth movable wall when the pressures in said fifth and sixth chambers are substantially equal, a seventh and an eighth chamber, a fifth movable wall separating said seventh and eighth chamber, fifth conduit means connecting said second chamber to said seventh chamber, said fifth conduit means being closed by said fifth movable wall when the pressures in said seventh and eighth chambers are substantially equal, sixth conduit means connecting said seventh chamber to said third chamber, and seventh conduit means connecting said eighth chamber to said fourth chamber, said fourth and fifth movable walls with their associated chambers and conduits providing a feedback arrangement; and a power output stage responsive to variations of the pressure in said fourth chamber.

15. An instrument as defined in claim 14 wherein each of said movable walls consists of a flexible diaphragm.

16. An instrument for measuring the angle formed by a moving airplane with its air stream in a predetermined plane of the airplane, said instrument comprising a sensing head rotatable about a predetermined axis and having a pair of apertures positioned at an angle to each other, each of said apertures being adapted to develop a fluid pressure representative of said angle of said airplane; a pressure amplifier stage including a first, a second and a third movable wall, the effective area of said first movable wall being larger than that of said second movable wall and larger than that of said third movable wall, said movable walls being secured to a member and movable in unison therewith, said first and said second movable walls defining a first chamber, said first and third movable walls defining a second chamber, conduit means connecting each of said apertures respectively to said first and to said second chamber, said second and said third movable wall being exposed to a reference pressure, a source of regulated elevated pressure, a third chamber, first conduit means having a first orifice for connecting said source to said third chamber, said third chamber having an opening communicating with said reference pressure, said member being movable with respect to said opening, whereby variations of the relative position of said member will cause modulation of the pressure in said third chamber, spring means coupled to said member for balancing said movable wall when the pressures in said first and second chamber are equal, a fourth chamber, a second orifice connecting said third chamber to said fourth chamber, a fifth and a sixth chamber, a fourth movable wall separating said fifth and sixth chamber, second conduit means connecting said first chamber to said fifth chamber, third conduit means connecting said fifth chamber to said fourth chamber, fourth conduit means connecting said sixth chamber to said third chamber, said second conduit means being closed by said fourth movable wall when the pressures in said fifth and sixth chambers are substantially equal, a seventh and an eighth chamber, a fifth movable wall separating said seventh and eighth chamber, fifth conduit means connecting said second chamber to said seventh chamber, said fifth conduit means being closed by said fifth movable wall when the pressures in said seventh and eighth chambers are substantially equal, sixth conduit means connecting said seventh chamber to said third chamber and seventh conduit means connecting said eighth chamber to said fourth chamber, said fourth and fifth movable walls with their associated chambers and conduits providing a feedback arrangement; a power output stage responsive to variations of the pressure in said fourth chamber; and means coupling said output stage to said sensing head for rotating said sensing head until said air pressures developed by said apertures are equal, whereby moisture contained in said apertures and conduit means is forced out of one of said apertures whenever said fourth or fifth movable walls move to permit communication respectively between said fourth and first chambers or between said third and second chambers.

17. An instrument for measuring the angle formed by a moving airplane with its air stream in a predetermined plane of the airplane, said instrument comprising a sensing head rotatable about a predetermined axis and having a pair of apertures positioned at an angle to each other, each of said apertures being adapted to develop a fluid pressure representative of said angle of said airplane; a first fluid pressure amplifier stage, means applying the fluid pressures developed by said apertures to said first pressure amplifier stage, a source of regulated fluid pressure, means coupled to said first pressure amplifier stage for varying the magnitude of said regulated fluid pressure in response to variations of said fluid pressures developed by said apertures; an intermediate fluid pressure amplifier stage responsive to variations of the magnitude of said regulated fluid pressure, said source of regulated fluid pressure being coupled to said intermediate amplifier stage, said intermediate amplifier stage developing magnified variations of said regulated fluid pressure in response to said variations of the amplitude of said regulated fluid pressure caused by said first pressure amplifier stage; a power output stage responsive to said magnified variations of said regulated fluid pressure; and means coupling said output stage to said sensing head, whereby said sensing head is rotated until said fluid pressures developed by said apertures are equal.

18. A differential pressure responsive device comprising: a first pneumatic pressure amplifier stage including a first and a second diaphragm defining a first chamber, a third diaphragm defining, with said first diaphragm, a second chamber, said first diaphragm having a larger effective area than that of said second and of said third diaphragm, means for applying differential pressures, to be measured, to said first and second chambers, said second diaphragm being exposed to a reference pressure, a first member interconnecting said first, second and third diaphragms to permit movement thereof in unison, a source of regulated fluid pressure, a third chamber defined by said third diaphragm, means including a first constant orifice for connecting said source to said third chamber, a second variable orifice connecting said third chamber to said reference pressure, said first member cooperating with said second variable orifice, means for balancing the forces acting on said diaphragms when the differential pressures are equal, whereby variations of the relative position of said member modulate the pressure in said third chamber; an intermediate pressure amplifier stage including a movable wall, one side of said movable wall being exposed to the pressure of said third chamber, conduit means connected to said source, an orifice in said conduit means, said conduit means being normally spaced from said movable wall to provide a variable orifice therewith, spring means for balancing the forces acting on said movable wall when the pressure in said third chamber has a predetermined value; and a power output stage responsive to variations of the pressure in said conduit means.

19. A differential pressure responsive device comprising: a fluid pressure amplifier stage including a first and a second diaphragm defining a first chamber, a third diaphragm defining, with said first diaphragm, a second chamber, said first diaphragm having a larger effective area than that of said second and of said third diaphragm, means for applying the differential pressures, to be measured, to said first and second chambers, a member interconnecting said first, second and third diaphragms to permit movement thereof in unison, a source of regulated fluid pressure, a third chamber defined by said second diaphragm, means including a first constant orifice for connecting said source to said third chamber, means including a first variable orifice connecting said third chamber to a reference pressure, a first member cooperating with said first variable orifice, means for balancing the forces acting on said diaphragms when the differential pressures are equal, whereby variations of the relative position of said member modulate the pressure in said third chamber, a fourth chamber defined by said third diaphragm, conduit means interconnecting said third chamber with said fourth chamber, a second constant orifice in said conduit means; and a power output stage responsive to variations of the pressure in said conduit means between said second constant orifice and said fourth chamber.

20. A differential pressure responsive device comprising: a fluid pressure amplifier stage including a first and a second diaphragm defining a first chamber, a third diaphragm defining, with said first diaphragm, a second chamber, said first diaphragm having a larger effective area than that of said second and of said third diaphragm, means for applying the differential pressures, to be measured, to said first and second chambers, a member interconnecting said first, second and third diaphragms to permit movement thereof in unison, a source of regulated fluid pressure, a third chamber defined by said second diaphragm, means including a first constant orifice for connecting said source to said third chamber, means including a second variable orifice connecting said third chamber to a reference pressure, said first member cooperating with said second variable orifice, means for balancing the forces acting on said diaphragms when the differential pressures are equal, whereby variations of the relative position of said member modulate the pressure in said third chamber, a fourth chamber defined by said third diaphragm, conduit means interconnecting said third chamber with said fourth chamber, a third constant orifice and a fourth constant orifice in said conduit means; and a power output stage responsive to variations of the pressure in said conduit means between said third and said fourth orifice.

21. A pressure responsive device as defined in claim 20 wherein the effective area of said second and of said third diaphragm are equal for balancing the forces acting on said diaphragms when the differential pressures are equal, thereby to obtain substantially infinite static gain.

References Cited in the file of this patent

UNITED STATES PATENTS

| | | |
|---|---|---|
| 2,343,288 | Fink | Mar. 7, 1944 |
| 2,451,451 | Tate | Oct. 12, 1948 |
| 2,463,585 | Young | Mar. 8, 1948 |
| 2,513,390 | Young | July 4, 1950 |
| 2,515,251 | Morris | July 18, 1950 |
| 2,520,547 | Hughes | Aug. 29, 1950 |
| 2,575,085 | Alyea | Nov. 13, 1951 |
| 2,628,086 | Cutler | Feb. 10, 1953 |
| 2,638,911 | Griswold | May 19, 1953 |
| 2,638,921 | Caldwell et al. | May 19, 1953 |
| 2,667,860 | Henderson et al. | Feb. 5, 1954 |
| 2,701,473 | Fieldgate | Feb. 8, 1955 |
| 2,711,754 | McKinney | June 28, 1955 |
| 2,712,321 | Grogan | July 5, 1955 |
| 2,724,398 | Higgins et al. | Nov. 22, 1955 |

UNITED STATES PATENT OFFICE
CERTIFICATE OF CORRECTION

Patent No. 2,834,208              May 13, 1958

Sydney E. Westman

It is hereby certified that error appears in the printed specification of the above numbered patent requiring correction and that the said Letters Patent should read as corrected below.

Column 1, line 66, for "instruments" read —instrument—; column 4, line 75, for "chamber 92" read —chamber 93—; column 13, line 42, for "angular" read —angularly—; column 15, line 49, for "itno" read —into—.

Signed and sealed this 8th day of July 1958.

(SEAL)

Attest:
KARL H. AXLINE
Attesting Officer

ROBERT C. WATSON
Commissioner of Patents